United States Patent
Saito et al.

(10) Patent No.: US 6,445,649 B1
(45) Date of Patent: Sep. 3, 2002

(54) APPARATUS AND METHOD FOR CONTROLLING MOVEMENT OF AN OPTICAL HEAD

(75) Inventors: Yasushi Saito, Chiba; Mitsuhiko Awata, Tokyo, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/503,913

(22) Filed: Feb. 15, 2000

(30) Foreign Application Priority Data

Feb. 26, 1999 (JP) .......................................... 11-051865

(51) Int. Cl.$^7$ ............................................... G11B 17/22
(52) U.S. Cl. ...................................... 369/30.1; 369/215
(58) Field of Search ........................ 369/32, 33, 44.78, 369/44.22, 44.29, 215

(56) References Cited

U.S. PATENT DOCUMENTS

| | | | | |
|---|---|---|---|---|
| 4,964,111 A | * | 10/1990 | Hangai et al. .............. | 369/215 |
| 4,977,554 A | * | 12/1990 | Hangai et al. .............. | 369/215 |
| 5,268,884 A | * | 12/1993 | Kiuchi et al. ................. | 369/33 |
| 5,623,464 A | * | 4/1997 | Tani ......................... | 369/44.28 |
| 5,875,161 A | * | 2/1999 | Takegawa ................. | 369/44.28 |
| 6,064,633 A | * | 5/2000 | Kuwayama et al. .......... | 369/32 |

* cited by examiner

*Primary Examiner*—Tan Dinh
(74) *Attorney, Agent, or Firm*—Rader, Fishman & Grauer PLLC; Ronald P. Kananen

(57) ABSTRACT

An information recording/reproduction apparatus is adapted to quickly move the optical pickup to a desired position on the optical disk being used with it without emitting any sound of collision. The information recording/reproduction apparatus adapted to use an optical disk comprises an optical pickup 5 supported by a lead screw 9 so to move freely at least in a radial direction of the optical disk 1, a thread motor 4 for driving the optical pickup 5 to move by the distance specified by a drive signal in the radial direction of the optical disk 1, a position detecting switch 7 for detecting the innermost movable limit of the optical pickup 5 in the radial direction of the optical disk 1 and a system controller 6 for controlling the movement of the optical pickup 5 by means of the drive signal applied to the thread motor 4, using the detected position as reference.

8 Claims, 3 Drawing Sheets

APPARATUS AND METHOD FOR CONTROLLING MOVEMENT OF AN OPTICAL HEAD

BACKGROUND OF THE INVENTION

1. Field of the Invention

This invention relates to an information recording/reproduction apparatus and an information recording/reproduction method as well as to a transmission medium. More particularly, it relates to an information recording/reproduction apparatus and an information recording/reproduction method adapted to control the position of the recording/reproduction position of the apparatus by means of the number of pulses output to the stepping motor thereof as well as to a transmission medium adapted to be used with such an apparatus and/or such a method

2. Prior Art

Information recording/reproducing apparatus adapted to record information on or reproduce information from an optical disk by irradiating it with a laser beam from an optical pickup are known.

Known information recording/reproduction apparatus record information or reproduce information from an optical disk by referring to a reference position where the optical pickup can access a lead area. In the information recording/reproduction apparatus, the optical pickup is moved to that position by causing it to move to the innermost periphery of the optical disk, detecting the optical pickup by means of a detection switch fitted to the innermost periphery of the optical disk and subsequently moving the optical pickup toward the outer periphery of the optical disk by a predefined quantity.

It is necessary for the information recording/reproduction apparatus to move the optical pickup to a predetermined position in order not to prevent the information on a so-called CD-R optical disk from being destroyed by heat produced by the laser beam when determining the type of the optical disk to be operating with it. Additionally, it is necessary for the information recording/reproduction apparatus to move the optical pickup in order to output any tracking error without fail when regulating the tracking balance.

However, since known information recording/reproduction apparatus are not adapted to control the position of the optical pickup, it is necessary to firstly move the optical pickup to the innermost periphery of the optical disk each time the optical pickup is moved to the reference position where it can access the lead area. Then, each time the optical pickup is moved to the innermost periphery of the optical disk, the stepping motor driving the optical pickup becomes out of step and emits a sound of collision. This known method is accompanied by an additional problem that the process of moving the optical pickup from the innermost periphery of the optical disk toward the outer periphery thereof is time consuming. Still additionally, an information recording/reproduction apparatus comprising an optical pickup that emits such a sound of collision is not "decent" and it is not pleasant for the user to hear such a noise.

On the other hand, it is necessary to move the optical pickup to a predetermined position in order to determine the type of the optical disk and regulate the tracking balance. Since known information recording/reproduction apparatus are not adapted to control the position of the optical pickup, it is necessary to issue a command to the servo controller to make the system controller move the optical pickup anew after the completion of the operation of determining the type of the optical disk and regulating the tracking balance. This process is rather cumbersome and time consuming.

In view of the above identified problems, it is therefore the object of the present invention to provide an information recording/reproduction apparatus and an information recording/reproduction method that are adapted to quickly move the optical pickup to a desired position on the optical disk being used with it without emitting any sound of collision even after the completion of the operation of determining the type of the optical disk and regulating the tracking balance. Another object of the present invention is to provide a transmission medium adapted to be used with such an apparatus and/or such a method.

BRIEF SUMMARY OF THE INVENTION

According to the invention, the above objects are achieved by providing an information recording/reproduction apparatus comprising a head supported by a support member so to move in a radial direction of the disk being used with it in order to record information on or reproduce information from the disk, said apparatus being adapted to move the head by a predetermined distance in a radial direction of the disk to a first position by means of a drive signal, detecting the first position of the head in terms of the radial direction of the head by means of a position detecting means and controlling the movement of the head by means of the drive signal, using the first position detected by the position detecting means as reference.

Thus, according to the invention, the optical pickup is required to be moved to the innermost periphery of the optical disk only once at the time of initialization of the apparatus in order to define a reference point for the movement of the optical pickup. Thereafter, it is no longer necessary to move the optical pickup to the innermost periphery. Thus, the time required for the optical pickup to be moved to the reference position can be minimized and the sound of collision emitted when the optical pickup is moved to the innermost periphery of the optical disk is eliminated.

DETAILED DESCRIPTION OF THE INVENTION

Now, a preferred mode of carrying out the invention will be described in detail for an information recording/reproduction apparatus, an information recording/reproduction method and a transmission medium according to the invention.

Figure 1:
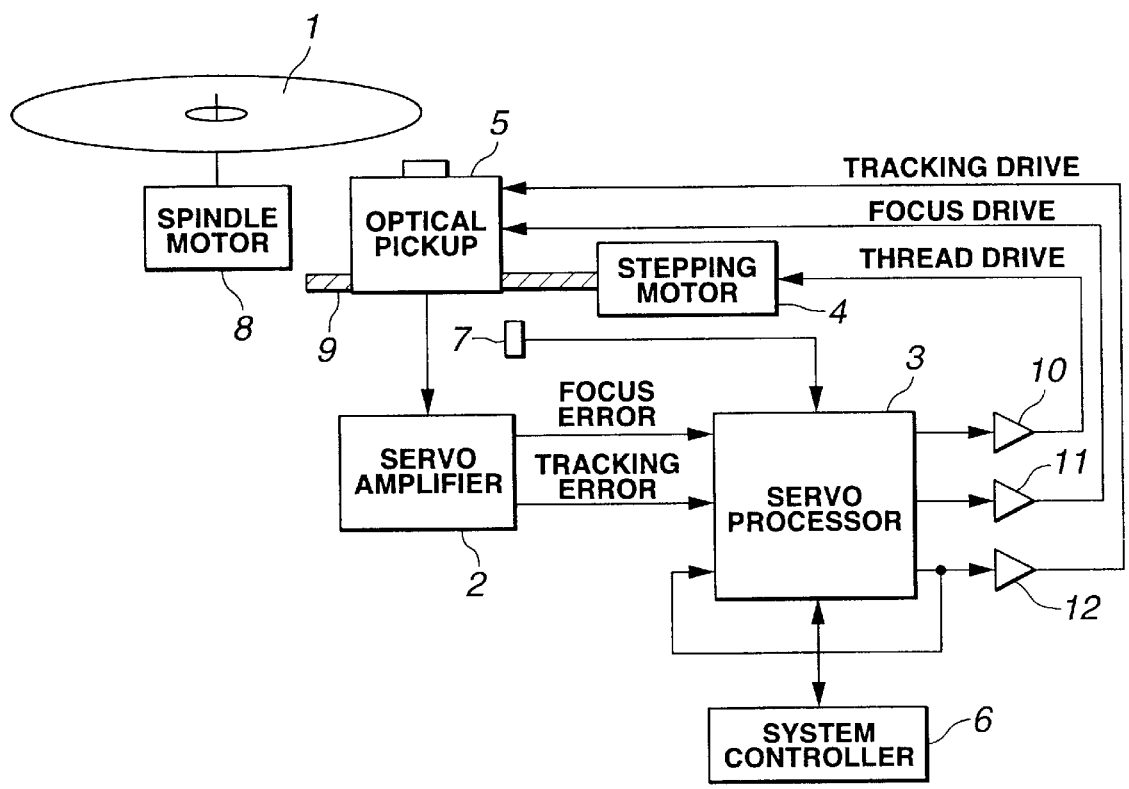
FIG. 1 is a schematic block diagram of an information recording/reproduction apparatus according to the invention.

As shown in FIG. 1, an information recording/reproduction apparatus according to the invention and using an optical disk comprises a spindle motor 8 for driving the optical disk 1 at a predetermined rate, an optical pickup 5 for recording information on or reproducing information from the optical disk 1 by irradiating it with the laser beam emitted from a built-in laser diode by way of an objective lens, a lead screw 9 supporting the optical pickup 5 so as to keep it movable in a radial direction of the optical disk 1, a thread motor 4 for moving the optical pickup 5 in a radial direction of the optical disk along the lead screw 9 and an innermost periphery detecting switch 7 for detecting the optical pickup 5 located at the innermost periphery of the optical disk 1. The thread motor 5 is a stepping motor.

The information recording/reproduction apparatus using an optical disk further comprises a servo amplifier 2 for generating a focus error signal and a tracking error signal from the signal output from the optical pickup 7, a servo processor 3 for generating a focus control signal, a tracking control signal and a thread control signal from the focus error signal and the tracking error signal from the servo amplifier 2 and a focus driver 11, a tracking drive 12 and a thread driver 12 for respectively generating a focus drive signal, a tracking drive signal and a thread drive signal from the focus control signal, the tracking control signal and the thread control signal from the servo processor 3 along with a system controller 6 for controlling the different components of the information recording/reproduction apparatus using an optical disk.

Now, the operation of the information recording/reproduction apparatus using an optical disk will be discussed below. The signal read by the optical pickup 5 is input to the servo amplifier 2. The signal is amplified by the servo amplifier 2, which generates a focus error signal and a tracking error signal. The generated focus error signal and the tracking error signal are then input to the servo processor 3. The servo processor 3 processes the input signals and outputs a focus drive signal, tracking drive signal and a thread drive signal. The tracking error signal output from the servo processor 3 is also fed back to the servo processor.

The focus drive signal, the tracking drive signal and the thread drive signal are then used to drive respectively a focus actuator for driving the objective lens of the optical pickup in the focussing direction, a tracking actuator for driving the objective lens in the tracking direction and the thread motor 4 for driving the optical pickup in the radial direction of the optical disk 1 along the lead screw 9.

The stepping motor 4 moves the optical pickup 5 by way of the lead screw. The optical disk 1 is driven to rotate by the spindle motor 8. The number of revolutions of the stepping motor 4 is determined by the pulse signal of the drive signal. Thus, the stepping motor drives the optical pickup 5 to move by a distance defined by the drive signal.

The innermost periphery detecting switch 7 arranged at the innermost periphery of the thread drive mechanism for driving the optical disk 1 in a radial direction by means of the lead screw 5 detects the optical pickup 5 located at the inner periphery of the optical disk 1 and the detection signal is input to the servo processor 3. The system controller 3 realizes this operation of driving the optical pickup 5 by sending a command to the servo processor 3 that may cause the optical pickup 5 to move toward the inner periphery of the optical disk 1 by N steps or toward the outer periphery of the optical disk 1 by N steps, where N is a natural number.

When the information recording/reproduction apparatus using an optical disk is initialized, the system controller 6 controls the optical pickup 5 so as to move it to the innermost periphery of the optical disk 1. At this time, servo processor 3 recognizes that the optical pickup 5 is located at the innermost periphery of the optical disk 1 by way of the innermost periphery detecting switch 7 operating as position detecting means and stops the thread motor 4 to make the optical pickup 5 to be accurately located there. Thus, the innermost periphery detecting switch 7 is used as position detecting means for detecting the optical pickup 5 located at the first position that defines the innermost movable limit of the optical pickup 5 in the radial direction of the optical disk 1.

The optical disk 1 has a lead-in area located near the inner periphery thereof. Before the optical pickup 5 initially accesses the optical disk 1, it has to be moved to a reference position from which it can access the lead-in area. Thus, the second position from which the optical pickup 5 can access the lead-in area is referred to as reference position.

The servo processor 3 drives the thread motor 4 by outputting a pulse signal to the latter. Thus, the servo processor 3 can specify the position of the optical pickup 5 by counting the number of pulses of the pulse signal. Then, the system controller 6 can recognize the position of the optical pickup by reading the positional information on the optical pickup 5 from the servo processor 3.

Figure 2:
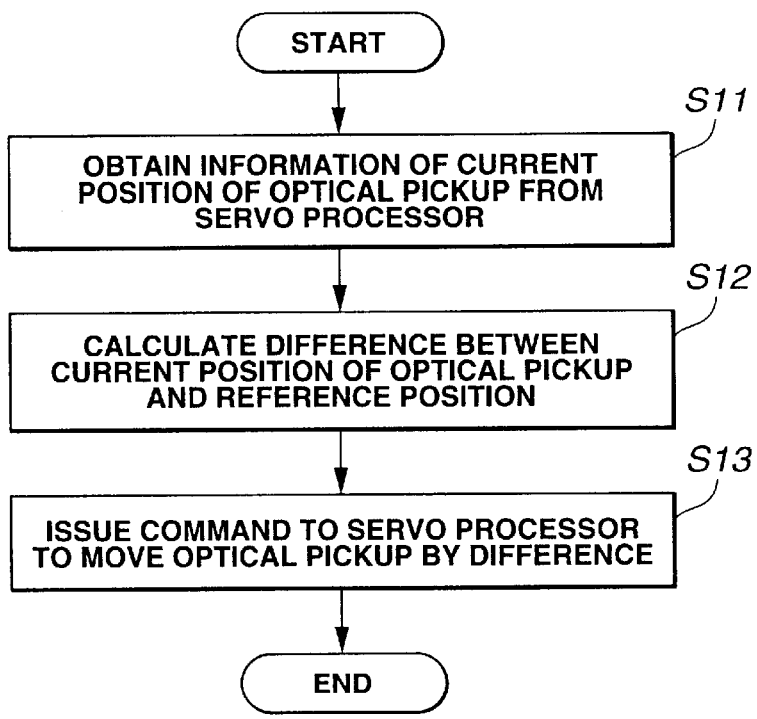
FIG. 2 is a flow chart of the processing operation of leading the optical pickup to the reference position.

Since the system controller 6 recognizes the first position of the optical pickup 5 as described above, it can move the optical pickup 5 to the second position, or the reference position, without firstly moving it to the innermost periphery of the optical disk 1. More specifically, as seen from the flow chart of FIG. 2, the system controller 6 reads the information on the current position of the optical pickup 5 from the servo processor 3 in Step S11. Then, the system controller 6 computationally determines the distance between the current position of the optical pickup 5 and the reference position in Step S12. Thereafter, the system controller 6 sends a command to the servo processor 3 that causes the optical pickup 5 to move by the determined distance. Thus, the system controller 6 can move the optical pickup 5 to the reference position without firstly moving it to the innermost periphery of the optical disk 1.

Figure 3:
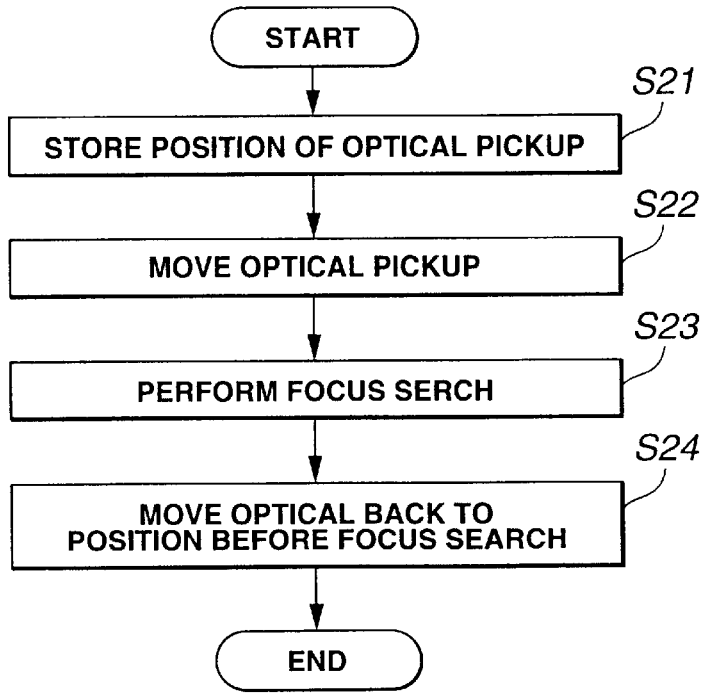
FIG. 3. Is a flow chart of the processing operation of determining the type of the optical disk.

The information recording/reproduction apparatus using an optical disk 1 has to determine the type of the optical disk, which may be a CD or a DVD. This operation of determining the disk type is referred to disk type determination. The operation of disk type determination is carried out by following the procedure shown in the flow chart of FIG. 3. Referring to FIG. 3, the system controller 3 firstly controls the servo processor 3 to make the latter store the position of the optical pickup 5 in Step S21. When determining the type of the optical disk, the servo processor 3 is used in stead of the above described innermost periphery detecting switch 7 as means for detecting the first position, or the current position of the optical pickup 5, in the radial direction of the optical disk 5.

Then, in Step S22, the system controller 6 issues a command to the servo processor 3 to cause the latter to move the optical pickup 5. Then, in Step S23, the system controller 6 turns on the laser diode provided on the optical pickup 5 and makes it to carry out a focus searching operation on the optical disk 1 in order to determine the type of the optical disk 1. Then, in Step S24, the system controller 6 issues a command to the servo processor 3 to cause the latter to return the optical pickup 5 to the position before the focus searching operation.

If it is determined as a result of the focus searching operation of Step S23 that the optical disk 1 is a recordable CD-R, the information stored on the spot irradiated by the laser beam can be destroyed by heat. Thus, the system controller 6 drives the optical pickup 5 to retire by means of a thread transfer mechanism comprising the thread motor 7 and the lead screw 9 and adapted to move the optical pickup 5 in the radial direction of the optical disk 1. With this arrangement, the heat produced by the laser beam irradiating the optical disk 1 can be dispersed to prevent any information on the optical disk 1 from being destroyed by heat.

The regulating operation of applying an offset voltage to the tracking control signal in such a way that the tracking error signal representing the displacement of the focal point of the laser beam from the target recording track formed on the information recording surface of the optical disk may oscillate from a center voltage under the condition where the focus servo is activated and the laser beam emitted from the optical pickup 5 is focussed on the information recording surface is referred to as tracking balance regulation.

Figure 4:
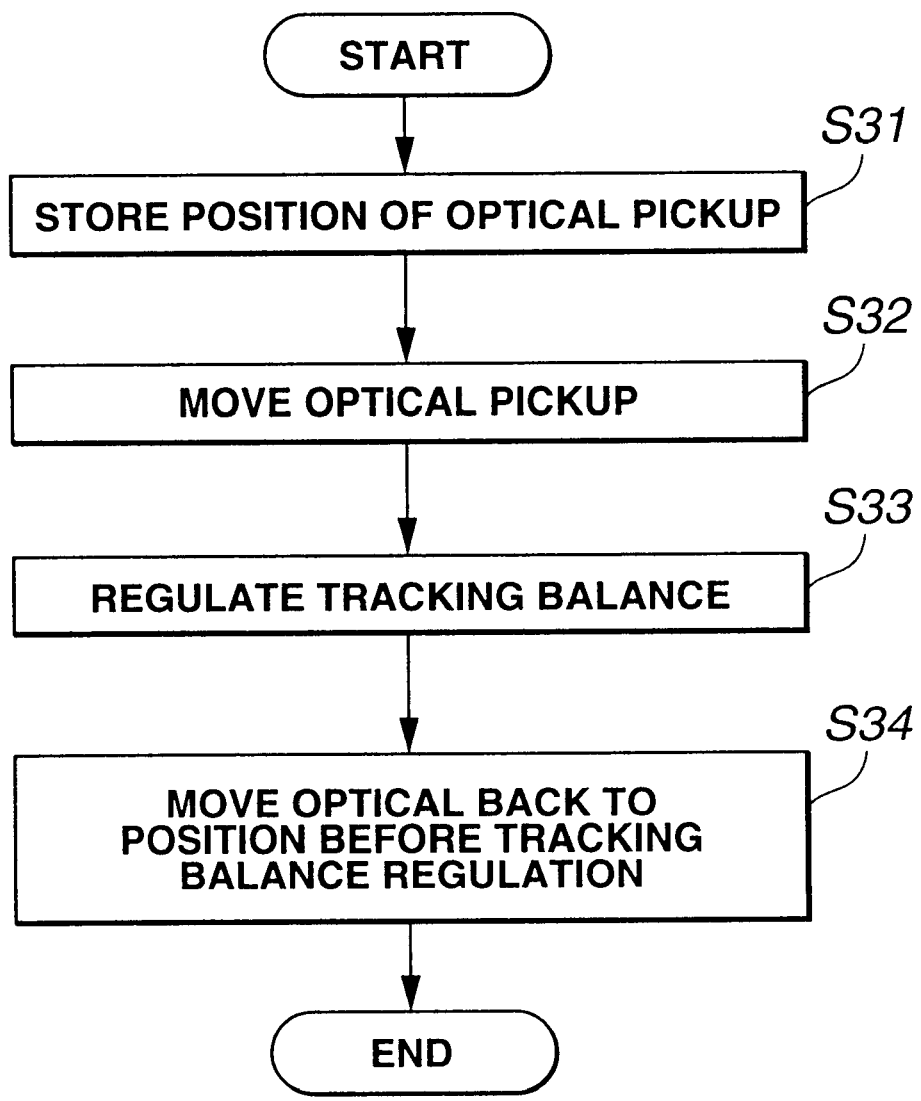
FIG. 4 is a flow chart of the processing operation of regulating the tracking balance of the optical disk.

For tracking balance regulation, it is necessary to move the optical pickup 5 by means of the thread transfer mechanism in such a way that a tracking error signal is generated without fail even if the optical disk is an eccentricity-free disk. The operation of tracking balance regulation is carried out by following the procedure shown in the flow chart of FIG. 4. Referring to FIG. 4, the system controller 3 firstly controls the servo processor 3 to make the latter store the position of the optical pickup 5 in Step S31. When regulating the tracking balance, the servo processor 3 is used in stead of the above described innermost periphery detecting switch 7 as means for detecting the first position, or the current position of the optical pickup 5, in the radial direction of the optical disk 5 as described above by referring to the operation of determining the disk type.

Then, in Step S32, the system controller 6 issues a command to the servo processor 3 to cause the latter to move the optical pickup 5. Then, in Step S33, the system controller 6 controls the operation of tracking balance regulation to be carried out properly. Then, in Step S34, the system controller 6 issues a command to the servo processor 3 to cause the latter to move the optical pickup 5 to the position for tracking balance regulation.

Now, an embodiment of transmission medium according to the invention will be described below. A transmission recording medium is a medium adapted to transmit an information recording/reproduction processing program for recording information on or reproducing information from a disk by means of a head supported by a support member so to move it freely at least in a radial direction of the disk, said information recording/reproduction processing program including a drive processing for moving the head in the radial direction of the head by the distance defined by a drive signal, a positional detection processing for detecting the first position of the head in the radial direction of the disk and a control processing for controlling the movement of the head by means of the drive signal used for the above drive processing, employing the first position detected by the positional detection processing as reference position.

The transmission medium may be a recording medium such as a CD-ROM that is a magnetic disk or a solid memory or a communication medium such as a network or a communication satellite.

As described above, the embodiment of the present invention comprises a thread transfer mechanism that is driven by a stepping motor 4 and controls the position of the optical pickup 5 by means of the number of pulses of the pulse signal output to the stepping motor.

Thus, the embodiment computationally determines the distance between the current position of the optical pickup 5 and the innermost periphery of the optical disk 1 by using the information obtained for the current position and stops the optical pickup 5 at a position in the lead-in area.

The embodiment also detects the position of the optical pickup 5 when the latter starts moving and detects the distance of movement of the optical pickup 5 from the position thereof obtained when the determining operation or the regulating operation is terminated. Then, the embodiment returns the optical pickup 5 to the original position by moving it back by the detected distance.

It may be understood that the embodiment can also be used to move the optical pickup 5 to an arbitrarily selected position by using the thread transfer mechanism driven by the stepping motor 4 and counting the number of pulses of the pulse signal output from the stepping motor 4.

While the head of an information recording/reproduction apparatus is an optical pickup 5 in the above embodiment, the head actually includes an objective lens provided in the optical pickup 5. Since the position at which the laser beam is focussed on the optical disk 1 is defined by the optical pickup 5 and the objective lens, the information recording/reproduction apparatus moves the position under control.

What is claimed is:

1. An information recording/reproduction apparatus for recording information on and reproducing information from a disk, said apparatus comprising:

a head supported by a support member so to move in a radial direction of said disk;

a drive means for driving said head to move a distance in the radial direction of the disk in accordance with a drive signal;

a position detection means for detecting a first position of said head in the radial direction of said disk, wherein said first position detected by said position detection means in an innermost movable limit of said head in the radial direction of said optical disk; and a control means for controlling the movement of said head by means of the drive signal applied to said drive means, using the first position detected by said position detection means as reference and said control means controls said drive means so as to cause it to move said head to the second position, wherein said second position is a reference position from which said head can access a lead-in area located near an inner periphery of said disk, wherein when said information recording/reproduction apparatus is initialized, said control means controls movement of said head to the innermost periphery of said disk and recognizes said head is located at said first position by way of a position detection operation, and when the head starts moving, said control means controls movement of said head to said second position when a determining operation or a regulating operation is terminated without firstly moving said head to said first position.

2. An information recording/reproduction apparatus according to claim 1, wherein
said drive means includes a stepping motor whose number of rotary steps is specified by a pulse signal and said control means controls said drive means by using the pulse signal as a drive signal.

3. An information recording/reproduction apparatus according to claim 2, wherein
the first position detected by said position detection means is the innermost movable limit of said head in the radial direction of said optical disk.

4. An information recording/reproduction apparatus according to claim 1, wherein said control means controls the movement of said head to the first position by using the first position detected by said position detection means as reference.

5. An information recording/reproduction apparatus according to claim 1, wherein said drive means includes a stepping motor whose number of rotary steps is specified by a pulse signal and said control means controls said drive means by using the pulse signal as drive signal.

6. An information recording/reproduction apparatus according to claim 1, wherein said control means controls said drive means by a drive signal so as to move said head to the target track of the recording tracks formed on said disk, using said first position as reference.

7. An information recording/reproduction method for recording information on and reproducing information from a disk by means of a head supported by a support member so to move in a radial direction of said disk, said method comprising steps of:

driving said head to move a distance in the radial direction of the disk in accordance with a drive signal;

detecting a first position of said head in the radial direction of said disk; and controlling the movement of said head by means of the drive signal applied to a drive means, using the first position detected by said position detection means as a reference and said controlling step controls said driving step so as to move said head to the second position, wherein said second position is a reference position from which said head can access a lead-in area located near an inner periphery of said disk, wherein when said information recording/reproduction apparatus is initialized, said controlling step controls movement of said head to the innermost periphery of said disk and recognizes said head is located at said first position by way of a position detection operation, and when the head starts moving, said controlling step controls movement of said head to said second position when a determining operation or a regulating operation is terminated without firstly moving said head to said first position.

8. A transmission recording medium is adapted to transmit an information recording/reproduction processing program for recording information on or reproducing information from a disk by means of a head supported by a support member so to move it in a radial direction of the disk, said information recording/reproduction processing program including:

a drive processing for moving the head a distance in the radial direction of the disk in accordance with a drive signal;

a position detection processing for detecting the first position of the head in the radial direction of the disk; and a control processing for controlling the movement of the head by means of the drive signal used for the above drive processing, employing the first position detected by the positional detection processing as a reference position and said control processing controls said drive processing to move the head to a second position, wherein the second position is a reference position from which the head can access a lead-in area located near an inner periphery of said disk, wherein when said information recording/reproduction apparatus is initialized, said control processing controls movement of the head to the innermost periphery of said disk and recognizes the head is located at the first position by way of a position detection operation, and when the head starts moving, said control processing controls movement of the head to the second position when a determining operation or a regulating operation is terminated without firstly moving the head to the first position.

* * * * *